July 20, 1954
T. DAVIDSON
2,684,113
PERCUSSION TYPE TIRE BEAD LOOSENING TOOL
Filed March 31, 1952
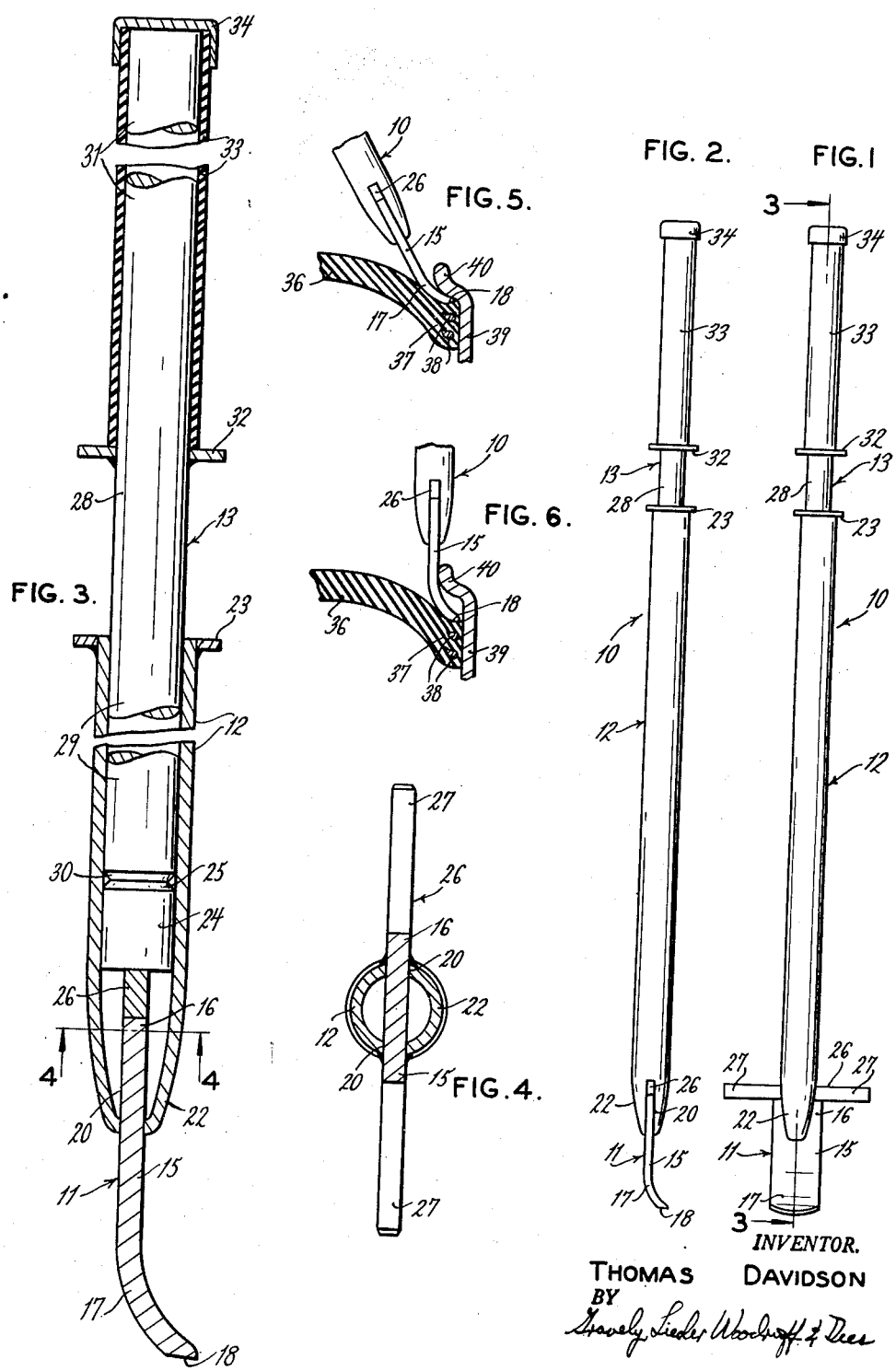
INVENTOR.
THOMAS DAVIDSON
BY
ATTORNEYS Patented July 20, 1954

2,684,113

UNITED STATES PATENT OFFICE 2,684,113

PERCUSSION TYPE TIRE BEAD LOOSENING TOOL

Thomas Davidson, St. Charles, Mo., assignor to Thomas Davidson and Ben H. Cook, doing business as Stemco Manufacturing Company, St. Charles, Mo.

Application March 31, 1952, Serial No. 279,532

1 Claim. (Cl. 157—1.17)

This invention relates to tire tools and especially to a tire tool or device for breaking the bead of a vehicle tire away from the supporting rim flange.

It is well known that vehicle tires have a tendency to seal against the supporting rim flange, which is commonly due especially to high loads carried by the vehicle over a relatively long period of use of the tire without changing its position relative to the supporting rim. Considerable difficulty has been encountered in effecting removal of the tire from the rim because of this tendency for the tire bead to freeze or seal itself against the rim flange. A number of devices have been provided for breaking loose the tire bead, but none have effectively reduced the physical exertion needed in carrying out this operation.

It is a principal object of this invention to overcome the objectionable features of tire tools heretofore provided for the purpose herein stated, and to overcome the problems involved.

It is a further object of this invention to provide a unique and useful device bringing together in one instrument a percussion means and a lever or prying means, whereby the useful features of both means may be applied concertedly to the loosening of the tire bead from the supporting rim flange.

The invention consists in the combination of a prying head, a handle suitable for manipulating said head, and percussion means associated with the handle for imparting to the head percussive shocks for driving the head between the tire bead and rim flange.

The invention further consists in the parts, and combination of parts and elements hereinafter more particularly described.

A preferred embodiment of the present invention is disclosed in the drawing, wherein:

Fig. 1 illustrates the tire tool in front elevational view;

Fig. 2 is a side elevational view of the tire tool;

Fig. 3 is a greatly enlarged broken sectional elevational view of the tire tool, as seen along line 3—3 of Fig. 1;

Fig. 4 is a detailed view, in transverse section as seen at line 4—4 of Fig. 3;

Figs. 5 and 6 are fragmentary views illustrating the function of the present tire tool in breaking loose the tire bead from its supporting rim, Fig. 5 particularly showing the starting operation of the tool, and Fig. 6 showing the operation of the tool in an advanced stage of its bead loosening function.

Reference will now be made to the several views of the accompanying drawing for an understanding of the construction and operation of the present tire tool. The tool assembly 10 is best shown in Figs. 1, 2, and 3. The assembly includes a head 11 and a handle 12, whereby the head may be manipulated in the manner shown in Figs. 5 and 6, presently to be described. The assembly further includes means 13 for imparting percussive shocks to the head 11 to effect bead separating action. This means, in the preferred embodiment, includes a plunger operatively carried by the handle 12, and directed for movement toward and away from the head 11.

The head 11 of the tire tool 10 consists in a flat plate or blade 15 having its inner end 16 carried in a suitable slot 20 in one end of the handle 12. The opposite end of the blade 15 is curved, as at 17, thereby locating the bevelled nose 18 in offset relation making it more effective for the purpose intended. The bevelled nose 18 is also formed with a slight transverse curvature, generally conforming with the circular shape of the tire rim.

The handle 12 has its end formed with a slot 20, and the end is also reduced or necked in as at 22. This latter formation brings the margins of the slot 20 into abutment with opposite sides of the blade 15, where the blade 15 may be secured by welding, or the like. Handle 12 is of tubular or hollow construction, having a suitable length to make the head 11 useful as a prying device or lever. The upper end of the handle is provided with a guard flange 23, which may be a washer carried adjacent the end of the handle and suitably welded in position as shown in Fig. 3.

The handle 12 carries suitable percussion means 13, including an anvil plug 24 having one end chamfered as at 25. This chamfer may be of the order of 30 degrees, in order to keep the plug 24 from being upset within the handle sufficiently to prevent its easy removal. The anvil plug rests on a portion of a foot rest bar 26 which lies within the slot 20 between the inner end 16 of the blade 15 and the end of slot 20. This construction is shown in detail in Figs. 3 and 4. The bar 26 has its projecting ends 27 located at opposite sides, so that either end 27 may be utilized to direct the tire tool by use of the foot, and to permit standing on the tool for additional loading.

The percussive means, of which the anvil plug 24 is a part, includes a plunger 28. In the preferred form, the plunger 28 is a solid body or bar with an inner end 29 guided in the handle 12 so that the chamfered end 30 thereof is in striking relation with the anvil plug 24. The chamfer 30 may be of the order of 30 degrees, to allow the inner end of the plunger to undergo some upset without causing it to stick in the handle. The outer end 31 of the plunger carries a guard flange 32 which is similar to the guard flange 23. Outwardly of the guard flange 32, the plunger portion 31 is provided with a sleeve 33 held in place between the flange 32 and a cap 34. The sleeve 33 may be formed from rubber or some suitable resilient plastic to absorb the shock that occurs when the percussion impact takes place between the striking faces of the inner end 29 of the plunger and the anvil 24.

The preferred tire tool as herein described is employed in the following manner, reference being made particularly to Figs. 5 and 6. A vehicle tire of conventional construction includes a side wall 36 terminating in an annular bead 37, usually reinforced by means of wires or other reinforcement 38. This conventional construction normally makes the tire bead relatively resistant to stretch in the circumferential direction, i. e., to undergo an increase in its diameter. As vehicle tires increase in size or change in construction to accommodate higher loading characteristics, the tires generally become exceedingly non-responsive to the type of prying and tire removal methods heretofore employed. It will be appreciated that the relatively inflexible or non-stretchable tire beads 37 which rest against the conventional rim 39 and are retained in position by the rim flange 40, must be in some way forced outwardly over the flange 40 before the tire may be removed from the rim 39. In like manner, mounting of the tire on the rim 39 necessitates moving the bead 37 over the flange 40.

Fig. 5 illustrates the initial working position of the tire tool 10 with respect to a conventional tire bead 37 and rim 39. It can be observed that the offset portion 17 of the blade 15 allows the bevelled nose 18 thereof to slide between the bead 37 and adjacent flange 40 without danger of the blade nose cutting into or otherwise damaging the tire side wall and bead. After the initial location of the tool 10, it is manipulated as a lever in the direction toward the vertical, that is toward a position generally vertically upright and parallel to the flat surface of the rim 39. The blade 15 tends to force the bead 37 inwardly along the surface of rim 39, thereby initiating the separation of the bead 37 from the rim flange 40. During this manipulation of the tool 10, the offset bevelled nose 18 continues to present a smooth surface against the tire bead, so that at no time in the use of the tire tool is the tire subjected to cutting or destructive action of the blade. The several views illustrating the operation of the presently improved tire tool are to be taken as typical of the use of the tool around any part or all of the circumference of the vehicle tire, whereby the tire bead may be broken away from the rim flange completely around its circumference.

The foregoing detailed description pertains to a presently preferred form and embodiment of a tire tool. It is understood, however, that certain changes and modifications may be made herein without departing from the invention as defined by the claim.

What is claimed is:

In a bead loosening tool for vehicle tires in which the tire bead tends to seal against the supporting rim flange, the combination of a hollow handle having a slot in one end, a tire bead loosening and prying blade fixed in said handle slot, said blade having a curved outer portion terminating in an off-set bevelled nose, a foot rest bar located in said slot adjacent and above the inner end and said blade to project transversely from opposite sides of said hollow handle in the plane of said blade, means to deliver repeated percussive shocks to said blade to drive said off-set bevelled nose between the tire bead and rim flange, said means including an anvil removably located in said hollow handle adjacent and above said foot rest bar with an outward striking face having a chamfered periphery, and a plunger reciprocable in said hollow handle with an inner end having an anvil striking face chamfered about its periphery and an outer end portion for gripping said plunger, and guard flanges on said handle and plunger, in position to guard the zone of the tool where said plunger moves relative to said handle.

References Cited in the file of this patent

UNITED STATES PATENTS

| Number | Name | Date |
|---|---|---|
| 260,821 | Armstrong | July 11, 1882 |
| 510,981 | Massey | Dec. 19, 1893 |
| 1,082,379 | West | Dec. 23, 1913 |
| 1,632,227 | Halsey | June 14, 1927 |
| 1,934,962 | Barry | Nov. 14, 1933 |
| 2,489,088 | Hewitt | Nov. 22, 1949 |
| 2,495,117 | McCollister | Jan. 17, 1950 |
| 2,571,517 | Aycock | Oct. 16, 1951 |
| 2,582,390 | Moore | Jan. 15, 1952 |